June 14, 1966  J. H. GOLATA  3,255,518
METHOD OF MAKING A WHEEL RIM
Filed Oct. 2, 1962  2 Sheets-Sheet 1

INVENTOR.
JOHN H. GOLATA
BY
*Barney, Kiselle, Raisch & Choate*
ATTORNEYS

June 14, 1966  J. H. GOLATA  3,255,518
METHOD OF MAKING A WHEEL RIM
Filed Oct. 2, 1962  2 Sheets-Sheet 2

INVENTOR.
JOHN H. GOLATA
BY
Barnes, Kisselle, Raisch & Choate
ATTORNEYS

United States Patent Office 3,255,518
Patented June 14, 1966

3,255,518
METHOD OF MAKING A WHEEL RIM
John H. Golata, Lansing, Mich., assignor, by mesne assignments, to Motor Wheel Corporation, Akron, Ohio, a corporation of Ohio
Filed Oct. 2, 1962, Ser. No. 227,761
5 Claims. (Cl. 29—159.1)

This invention relates generally to the manufacture of annular members of predetermined cross sectional contour and thickness, and more particularly to an improved method of forming vehicle wheel rims having a cross section of variable thickness.

An object of the present invention is to provide a relatively simple and inexpensive method of producing an annular article having a radial thickness which varies axially of the article.

Another object is to provide an improved method for producing a wheel rim wherein an accurately controlled contour is imparted to the rim while it is cold worked in both circumferential and axial directions to thereby obtain a tapered section rim possessing maximum strength with minimum weight and having a desirable surface finish.

A further object of the present invention is to provide an improved method of producing a wheel rim which is adapted to quantity production procedure without sacrificing uniformity of finished product and which involves a minimum of separate operations and scrap loss.

Other objects, features and advantages of the present invention will become apparent from the following description taken in conjunction with the accompanying drawings in which.

Figure 1:
FIG. 1 is a plan view of a strip of metal from which a wheel rim is formed in accordance with this invention.

Referring in more detail to FIG. 1 of the accompanying drawings, in accordance with this invention a hot rolled metal strip 20 is provided having a properly developed width and length to produce a specific size rim, taking into account the subsequently described forming steps of the invention, and having a gauge equal to or slightly larger than the maximum radial thickness of the finished rim. Strip 20 is preferably made of steel but other material such as aluminum may also be formed by the present method.

Figure 2:
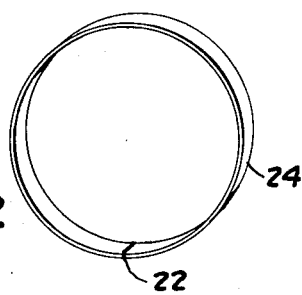
FIG. 2 is a perspective view of an annular blank formed from the strip of FIG. 1.
Figure 3:
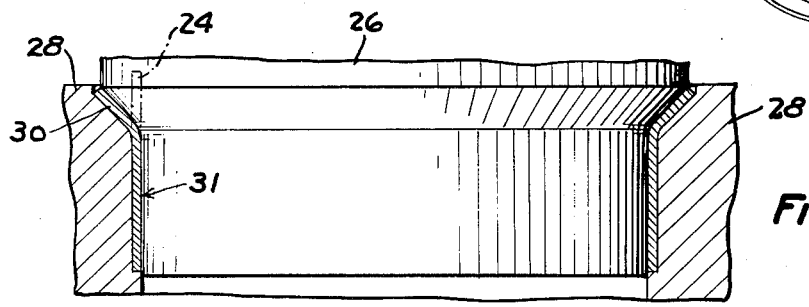
FIG. 3 is a fragmentary sectional view taken in a radial plane along the axis of the blank illustrating a pre-forming step of the method.

As shown in FIG. 2, strip 20 is coiled into a hoop and the free ends are joined at 22 by a conventional operation such as flash butt welding, shielded or submerged arc welding, or high-frequency welding to provide a cylindrical blank 24. After the flash resulting from the welding operation is removed, blank 24 is subjected to a die operation as shown in FIG. 3 wherein suitably shaped male and female dies 26 and 28 are employed to round and size the blank to a predetermined diameter. One end of the blank is flared outwardly in this die operation to form a flange portion 30, thereby providing a pre-formed blank 31 having part of the contour of the finished wheel rim.

Figure 4:
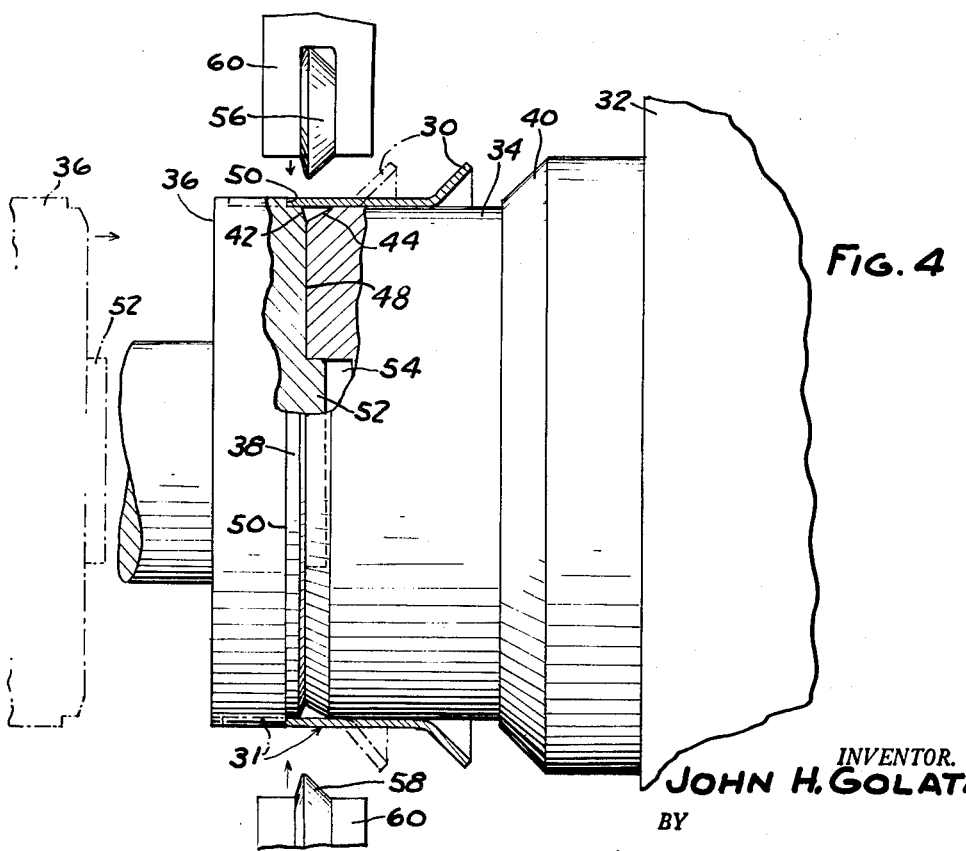
FIG. 4 is a fragmentary elevational view illustrating the step of loading the blank onto a two-part mandrel of a spinning machine, with the pre-formed blank shown in section and a portion of the mandrel broken away.

After the coiled and pre-formed rim blank 31 is removed from the dies 26, 28 it is ready for loading in a conventional spinning machine of either the vertical or horizontal type. Since this equipment is conventional, only a spindle 32, a specially provided mandrel 34 and a tailstock clamp 36 of such a machine are shown in FIG. 4. Mandrel 34 is a revolving member mounted for rotation with spindle 32, and clamp 36 is a free rotating member mounted on the tailstock of the spinning machine. Clamp 36 has a mandrel portion 38 adapted to butt against the end face of mandrel 34 to thereby form, together with a shoulder portion 40 of mandrel 34, a separable two-part mandrel which is contoured complementally to the inside shape of the desired part. The adjacent edges 42 and 44 of mandrels 38 and 34 respectively are bevel shaped to conjointly provide a contour complemental to the inside contour of a gutter 46 which is formed in the rim blank by method steps described subsequently in connection with FIGS. 5 and 6. It is to be noted that the parting line 48 of the separable mandrel intersects the gutter contour 42, 44 at the radially innermost point thereof to permit separation of mandrels 34, 38 from one another after the article has been formed thereon and to facilitate removal of the finished article from mandrel 34.

To load blank 31 into the spinning machine, clamp 36 is first moved axially away from mandrel 34 a distance sufficient to permit blank 31 to be inserted therebetween with flange 30 facing mandrel 34. Due to the previous rounding and sizing die operation of FIG. 3, blank 31 is adapted to fit slidably but snugly onto mandrel 34. Initial loading of blank 31 into the position shown in broken lines in FIG. 4 is facilitated by the conical shape of mandrel edge 44 and by the outwardly flared flange 30.

Then clamp 36 is moved axially towards mandrel 34 so that a shoulder 50 thereof engages the adjacent cylindrical edge of blank 31 and pushes the blank further onto mandrel 34 as mandrel 38 is brought against mandrel 34, thereby automatically locating and clamping blank 31 in the position shown in solid lines in FIG. 4 in proper relationship with the gutter contour 42, 44 of mandrels 34 and 38. During this positioning step an axial projection 52 on mandrel 38 is received in an axial recess 54 in the end face of mandrel 34 to lock the mandrel parts in co-axial alignment.

Figure 5:
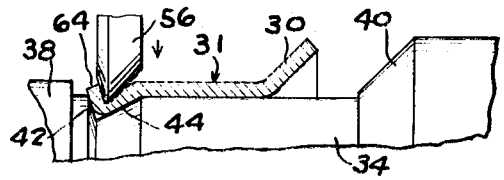
FIGS. 5-8 are fragmentary elevational views illustrating successive steps of forming the wheel rim with the apparatus of FIG. 4 by a combined roll forming and spinning operation.

With blank 31 thus clamped in place on the mandrel, spindle 32 is rotated so as to rotatably drive mandrel 34, blank 31 and tailstock 36 as a unit. One or more work rollers 56, 58, is then fed radially inwardly relative to the rotational axis of the blank into rolling engagement therewith so as to plunge form gutter 46 as shown in FIG. 5. Roller 56 may be either powered or free rolling and is supported for rotation about its axis on a work slide 60 which is actuated by a conventional tracer attachment, not shown. Any suitable contour follower type of equipment may be utilized to automatically control the feed of roller 56 in accordance with the method described herein. It is to be noted that roller 56 is suitably pointed to displace the rim metal radially inwardly against surfaces 42, 44 so that the outer side 64 of gutter 46 is circumferentially roll formed during the radial infeed of roller 56.

Figure 6:
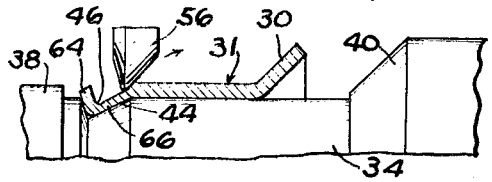
Figure 7:
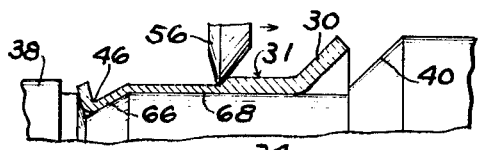
Figure 8:
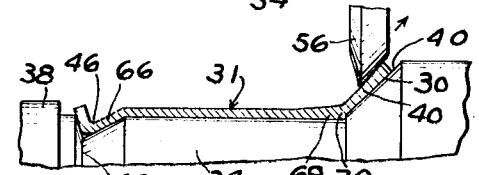

As shown in FIG. 6, roller 56 is then fed transversely towards the flared end of blank 31 and parallel to surface 44 and at a predetermined distance therefrom so as to axially displace the rim metal by a spinning action to thereby impart the desired thickness to the inner side 66 of the gutter. Then as shown in FIG. 7, roller 56 is fed along the base 68 of blank 31, likewise reducing the stock thickness thereof and, due to the axial displacement of the metal, simultaneously advancing flange 30 towards mandrel shoulder 40. As roller 56 approaches flange 30, the tracer control progressively retracts the roller radially outwardly from rim 31 so that a taper section 69 (FIG. 8) is formed in rim base 68 which terminates in a corner section 70. Finally, the spinning operation is completed by retracting roller 56 along flange 30 as shown in FIG. 8 in a direction parallel to mandrel shoulder 40 to thereby reduce flange 30 to the desired thickness.

After the spinning operation is completed, the rotation of the mandrels is stopped, tailstock 36 is withdrawn from mandrel 34 to its loading position and the spun blank 31 is stripped from mandrel 34.

Figure 9:
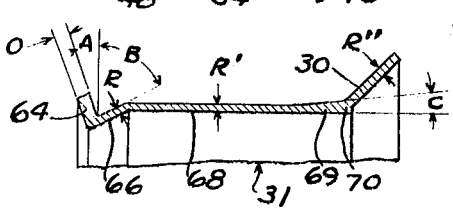
FIG. 9 is a fragmentary sectional view illustrating the contour of the rim after completion of the steps shown in FIGS. 5-8.

Refering to FIG. 9, the rim resulting from the above described steps varies in radial thickness from one end thereof to the other. The outer side 64 of gutter 46 is of original stock thickness O and the inner side 66 is reduced to thickness R, and gutter sides 64, 66 are disposed at angles A and B respectively relative to a radial center plane of the gutter. Base section 68 is reduced still further to thickness R' and merges with section 69 which tapers at angle C into the heavy corner section 70 of flange 30 which in turn has been spun to an intermediate thickness R''. By way of illustration and not by way of limitation, these dimensions and angles may be as follows:

|   | Inches |
|---|---|
| O | .375 |
| R | .250 |
| R' | .203 |
| R'' | .280 |

|   | Degrees |
|---|---|
| Angle A | 15 |
| Angle B | 62 |
| Angle C | 5 |

The resulting product has been cold worked in both circumferential and axial directions to thereby provide desirable strength characteristics in a wheel rim, and the rolling action also imparts an enhanced surface finish to the rim.

Figure 10:
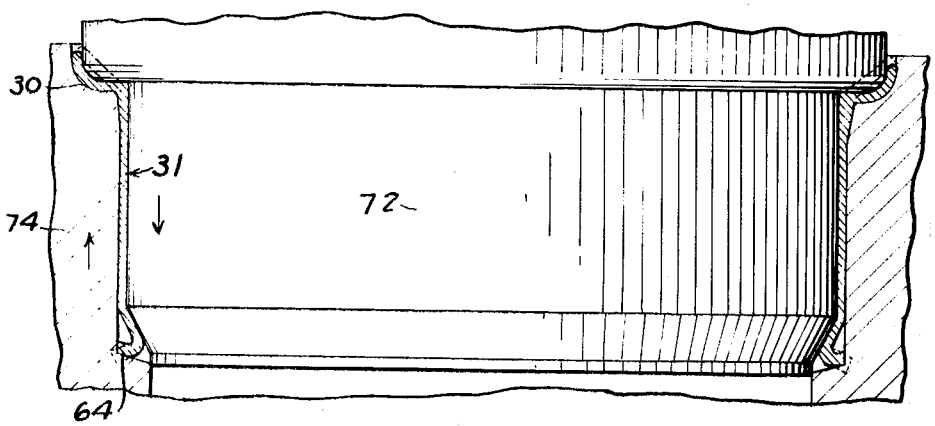
FIG. 10 is a fragmentary elevational view taken partially in section in a radial plane along the axis of the rim illustrating a die pressing operation for imparting the final form to the wheel rim.

Depending upon the final shape desired, it may be necessary to employ subsequent die operations to complete the part. As shown in FIG. 10, suitably contoured male and female dies 72 and 74 may be utilized in a die pressing operation to simultaneously size the inside diameter of the rim and to finish form gutter leg 64 and flange 30.

From the foregoing description it will now be apparent that the method of the invention is readily adaptable to mass production techniques and may be performed on conventional contour follower type equipment, either specially built for the specific application or on standard shear spinning equipment even though this process strays considerably from the sine law that is normally used in true shear spinning. It is to be noted that by first plunge forming gutter 46 in the operation of FIG. 5, one end of the rim blank is anchored against axial movement on the mandrel so that the work roller subsequently may be fed transversely across the rim periphery in the spinning operations to produce the axial flow of metal. In addition, due to the location of the mandrel parting line 48 at the vertex of gutter 46, the rim is automatically unclamped for removal by retracting tailstock 36 from mandrel 34.

I claim:
1. A method of forming an annular article having a variable thickness cross section with a radially displaced and circumferentially extending gutter portion in the outer periphery thereof which is generally V-shaped in radial cross section comprising the steps of:
  positioning an annular blank having a minimum radial thickness at least equal to the maximum radial thickness of the finished article concentrically on a mandrel having a forming contour complemental to the finished contour of one side of the article so that the portion of the blank which is to be formed into the radially displaced gutter portion of the article is adjacent the correspondingly contoured portion of the mandrel,
  causing relative rotation between the blank and a suitably contoured work roller positioned adjacent said other side of the article and having a generally V-shaped contour generally complemental to the gutter portion contour,
  moving the roller radially towards the other side of the blank into rolling engagement with said gutter portion of the blank until it is radially displaced into contact with the gutter forming contour of the mandrel to thereby roll form the circumferential gutter portion into the blank and thereby anchor the blank against axial bodily movement relative to the mandrel,
  then moving said roller transversely across said other side of the blank while continuing said rotation so as to axially displace the blank metal away from the gutter portion,
  and while so moving the roller controlling the radial distance between the roller and the mandrel to thereby form the desired variable thickness cross section into the article.

2. A method of making a variable thickness wheel rim having a rim base with a gutter which is generally V-shaped in radial cross section adjacent one edge thereof and a radially outwardly extending flange adjacent the other edge thereof comprising the steps of:
  providing an annular rim blank having a radial thickness at least equal to the maximum radial thickness of the finished wheel rim and having one end edge at least partially formed into said flange,
  securing the blank for rotation on a mandrel having an external contour complemental to the finished inside contour of the wheel rim with the blank positioned such that the edge portion thereof which is to be formed into the gutter is in overlying relation with the correspondingly contoured portion of the mandrel,
  causing relative rotation between the blank and a suitably contoured work roller having a generally V-shaped contour generally complemental to the gutter contour,
  moving the roller radially inwardly relative to the axis of the mandrel into rolling engagement with said gutter edge portion of the rotating blank until said portion is radially displaced against the gutter forming contour of said mandrel and thereby anchor the blank against axial bodily movement relative to the mandrel,
  moving said roller transversely across the blank towards the flanged edge thereof while continuing said rotation so as to axially displace the rim metal towards the flange contour of the mandrel and then along the same by a spinning action,
  and while so moving the roller controlling the radial distance between the roller and the mandrel to thereby spin the inner side of the gutter, the rim base and the rim flange to the desired radial thickness.

3. The method set forth in claim 2 wherein said step of securing said blank comprises separating a two-part separable mandrel, end-loading the rim blank onto one part of the mandrel so that it is partially inserted thereon and then closing the mandrel parts together to thereby engage the outer edge of the rim blank and move the blank axially into forming position on said one mandrel part as the mandrel parts are fully closed together in abutting relation with one another.

4. A method of producing a wheel rim having a gutter section adjacent one end thereof comprising the steps of:
  providing an annular rim blank having a radial thickness at least equal to the maximum radial thickness of the finished rim,
  performing a die operation to round and size the rim blank while outwardly flaring the end thereof opposite the gutter end,
  partially loading the rim blank flared end first on a mandrel having an external contour complemental to the finished inside contour of the wheel rim between the gutter and flared end thereof so that the gutter end of the blank protrudes from the mandrel,
  moving a tailstock clamp axially towards the mandrel so as to push the rim blank axially into the correct forming position relative to the mandrel contour,
  rotating the mandrel so as to rotate the rim blank and clamp therewith,
  feeding a work roller radially into the gutter section of the blank to plunge form the gutter and thereby anchor the rim against axial bodily movement away from the tailstock clamp,
  and forming the rotating rim blank to the desired cross sectional contour by controlled movement of a spin roller across the periphery of the blank in a direction away from the tailstock clamp.

5. A method of producing a varied thickness wheel rim having a gutter therein adjacent one edge thereof comprising the steps of providing an annular blank of properly developed width and thickness for forming into the rim by said method, partially end-loading said blank gutter edge last on a two-part separable mandrel having an external contour complemental to the inside contour of the rim with the parting line of the mandrel intersecting the vertex of the rim gutter contour of the mandrel, moving a tailstock clamp axially toward the mandrel to first engage the gutter edge of the blank and then to push the blank axially on the mandrel into correct forming position relative to the mandrel contour, rotating said blank relative to a work roller, feeding the roller into said rotating blank to rough roll form said gutter and then feeding the roller transversely of said blank at a controlled distance from the mandrel to spin form the inner side of said gutter and the base of the rim to thereby produce the desired thickness therein.

References Cited by the Examiner

UNITED STATES PATENTS

| | | | |
|---|---|---|---|
| Re. 14,713 | 8/1919 | Putman | 29—159.01 |
| 1,695,531 | 12/1928 | Budd | 29—159.1 |
| 1,795,379 | 3/1931 | Schmidt | 72—84 |
| 2,075,294 | 3/1937 | Le Jeune | 29—159.01 |
| 2,359,479 | 10/1944 | Ingersol | 29—159.01 |
| 2,932,890 | 4/1960 | Sporck et al. | 72—85 |
| 2,983,033 | 5/1961 | Cox | 29—159.01 |
| 3,029,667 | 4/1962 | Sporck | 72—105 |

JOHN F. CAMPBELL, *Primary Examiner.*

THOMAS H. EAGER, *Examiner.*